(12) United States Patent
Hustin et al.

(10) Patent No.: US 11,294,033 B2
(45) Date of Patent: Apr. 5, 2022

(54) DEVICE AND METHOD TO ESTIMATE A PHASE FOR THE QUAD OF A PIXEL FROM AN IMAGE SENSOR

(71) Applicant: Sony Semiconductor Solutions Corporation, Kanagawa (JP)

(72) Inventors: Serge Hustin, Stuttgart (DE); Jeroen Hermans, Stuttgart (DE); Gunter Troll, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 503 days.

(21) Appl. No.: 16/425,053

(22) Filed: May 29, 2019

(65) Prior Publication Data
US 2019/0369211 A1    Dec. 5, 2019

(30) Foreign Application Priority Data
May 29, 2018  (EP) .................................... 18174863

(51) Int. Cl.
*G01S 17/06*  (2006.01)
*G01S 7/48*  (2006.01)

(52) U.S. Cl.
CPC ............... *G01S 7/48* (2013.01); *G01S 17/06* (2013.01)

(58) Field of Classification Search
CPC .......... G01S 15/00; G01S 17/00; G01S 19/00; G01S 17/894; G01S 17/36; G01S 17/08; G01S 17/06; G01S 17/88

USPC ................... 250/208.1, 214 R, 221
See application file for complete search history.

(56) References Cited

U.S. PATENT DOCUMENTS

| 8,830,277 B2 | 9/2014 | Higashi et al. |
| 9,007,478 B2 | 4/2015 | Wang et al. |
| 9,538,070 B2 | 1/2017 | Okigawa |
| 2002/0015103 A1* | 2/2002 | Shi ....................... H04N 5/2256 348/348 |
| 2016/0329906 A1 | 11/2016 | Patukuri et al. |

OTHER PUBLICATIONS

[No Author Listed], Introduction to the Time-of-Flight (ToF) System Design. User's Guide. Texas Instruments. Literature No. SBAU219D. Revised May 2014. 32 pages.

* cited by examiner

*Primary Examiner* — Que Tan Le
(74) *Attorney, Agent, or Firm* — Wolf, Greenfield & Sacks, P.C.

(57) ABSTRACT

A device includes a circuitry which has an image sensor with a plurality of pixels, wherein the circuitry obtains a differential mode for a quad of each pixel from the plurality of pixels of the image sensor, being representative of a depth information; obtains a first input based on a common mode signal for the quad of the pixel, being representative of an intensity of ambient light; obtains a second input being representative of a background light rejection ratio of the pixel; and estimates a phase for the pixel from the plurality of pixels of the image sensor based on the differential mode, the first input and the second input.

18 Claims, 4 Drawing Sheets

DEVICE AND METHOD TO ESTIMATE A PHASE FOR THE QUAD OF A PIXEL FROM AN IMAGE SENSOR

CROSS REFERENCE TO RELATED APPLICATIONS

The present application claims priority to European Patent Application 18174863.3 filed by the European Patent Office on May 29, 2018, the entire contents of which being incorporated herein by reference.

TECHNICAL FIELD

The present disclosure generally pertains to a device and a method in the field of electronic devices, e.g. time of flight sensors.

TECHNICAL BACKGROUND

Generally, a device such as a time of flight (ToF) camera is known that includes a light source that emits light on a scene, and objects in the scene may reflect the light.

Moreover, for example, an image sensor in the time of flight camera receives part of the reflected light. The time between the emission of light and the detection of its reflection on the image sensor may be measured, which may be proportional to a distance information of the objects from the ToF camera.

Moreover, it is known that the available time of flight cameras may estimates a depth value and may further compute a confidence, e.g., based on the distance information, etc.

However, for example, the depth values and the computed confidence using such devices may typically have error, for example, when used with strong background lights, stroboscopic light sources, etc.

Although techniques exist for obtaining a differential mode and a common mode signal, e.g., for a pixel in the image sensor of the time of flight cameras, and estimating a phase, it is generally desirable to improve devices and methods for obtaining a differential mode, a common mode, a first input, a second input and estimating a phase.

SUMMARY

According to a first aspect, the disclosure provides a device comprising circuitry including an image sensor having a plurality of pixels, the circuitry is configured to obtain a differential mode for a quad of each pixel from the plurality of pixels of the image sensor, being representative of a depth information; obtain a first input based on a common mode signal for the quad of the pixel, being representative of an intensity of ambient light; obtain a second input being representative of a background light rejection ratio of the pixel; and estimate a phase for the pixel from the plurality of pixels of the image sensor based on the differential mode, the first input and the second input.

According to a second aspect, the disclosure provides a method for a device comprising circuitry including an image sensor having a plurality of pixels, the method comprises obtaining a differential mode for a quad of each pixel from the plurality of pixels of the image sensor, being representative of a depth information; obtaining a first input based on a common mode signal for the quad of the pixel, being representative of an intensity of ambient light; obtaining a second input being representative of a background light rejection ratio of the pixel; and estimating a phase for the pixel from the plurality of pixels of the image sensor based on the differential mode, the first input and the second input.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
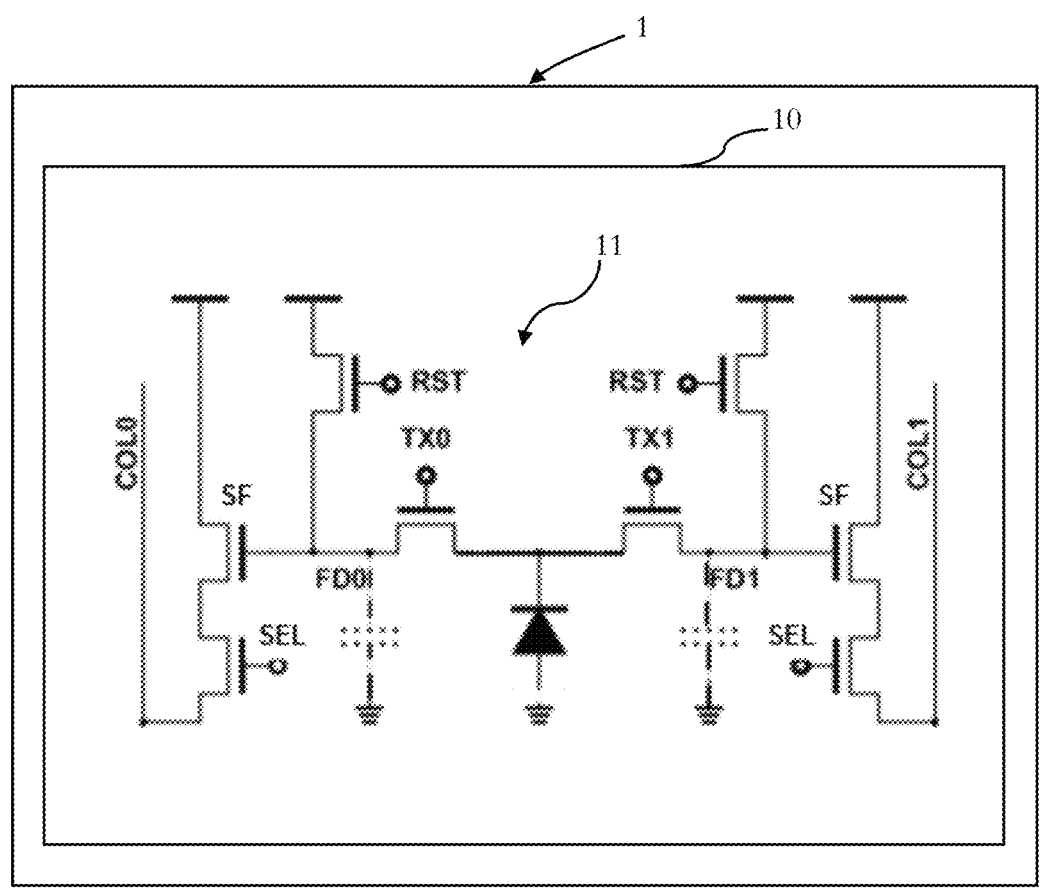
FIG. 1 schematically illustrates an embodiment of a system including the device for obtaining a differential mode and a common mode signal for each quad of a pixel.

Before a detailed description of the embodiments under reference of FIG. 1 is given, general explanations are made.

As mentioned in the outset, generally a time-of-flight (ToF) camera is known that works by illuminating a scene with a modulated light source, and detects light reflected from the scene. Moreover, the phase shift between the illumination and the reflection may be measured and may provide a distance information, etc.

The time-of-flight (ToF) camera may have a detection source, e.g., an image sensor which may detect the light reflected from the scene. Moreover, the image sensor may detect an ambient component and a reflected component, and a distance information (i.e. a depth value) may be obtained from the reflected component. Furthermore, the ambient component may reduce the signal to noise ratio and may cause error in estimated depth values, etc., for example, when used with strong, varying background light.

Consequently, some embodiments pertain to a device comprising circuitry including an image sensor having a plurality of pixels, the circuitry is configured to obtain a differential mode for a quad of each pixel from the plurality of pixels of the image sensor, being representative of a depth information; obtain a first input based on a common mode signal for the quad of the pixel, being representative of an intensity of ambient light; obtain a second input being representative of a background light rejection ratio of the pixel; and estimate a phase for the pixel from the plurality of pixels of the image sensor based on the differential mode, the first input and the second input.

The device may be, for example, any electronic device that has a circuitry which includes the image sensor. For example, in some embodiments, the device may be a time of flight sensor including the circuitry having the image sensor.

In some embodiments, the device which may be the time of flight sensor, may be incorporated in other electronic devices. For instance, the time of flight sensor may be based on, e.g., a continuous wave time of flight (CWTOF), a direct time-of-flight imager, an RF-modulated light source, etc., and it may be incorporated in an electronic device such as an imaging system, a smartphone, a computer, a robot, a (piece of) detection equipment, or the like.

The circuitry includes the image sensor having the plurality of pixels which, in some embodiments, may be arranged in a two dimensional (2D) array, a three-dimensional (3D) array, etc. For example, the image sensor may be based on, e.g., a current assisted photonic demodulator (CAPD), a pinned photodiode (PPD), a photo-gate, a partially pinned PPD, a charge-coupled device (CCD) technology, a complementary metal oxide semiconductor (CMOS) technology, or the like. Moreover, the image sensor may include a 2D array of pixels, wherein each pixel includes one or more light detection elements and may detect light (e.g. pulses of light) reflected from objects in a scene, etc.

For instance, in some embodiments, the time of flight sensor may be based on the continuous wave time of flight, moreover, the illuminated light may be pulsed or modulated by a continuous-wave (CW), e.g., a sinusoid or square wave, etc.

Furthermore, in some embodiments, the image sensor may detect the reflected light, and the plurality of pixels in the image sensor may be controlled by a common demodulation input signal. Each pixel may have two nodes (i.e. a Node-A and a Node-B, as it is generally known) and during integration time, the photocurrent may be directed towards Node-A or Node-B by driving the corresponding demodulation signals (i.e. a first demodulation signal and a second demodulation signal) in the opposite phase.

For example, if the first demodulation signal is active, Node-A may be discharged, and if the second demodulation signal is active, Node-B may be discharged. Furthermore, during readout time, demodulation signal may be stopped and the pixel may be readout and each pixel in the array of pixels may generate two outputs, as it is generally known to the skilled person.

Moreover, the circuitry obtains a differential mode for a quad of each pixel from the plurality of pixels of the image sensor, being representative of a depth information.

In some embodiments, the pixel may be a four-quad pixel, and the circuitry may further obtain four differential modes based on four different illumination phase delays.

For example, in some embodiments, the ToF sensor may obtain multiple samples per every measurement. Moreover, each sample may be considered a quad and may be phase delayed by 90 degrees, and a total of four samples (i.e. four quads) for one measurement may be obtained. For example, the phase may be delayed by 0 degree, 90 degree $$\left(\frac{\pi}{2}\right),$$

80 degree ($\pi$), and 270 degree $$\left(\frac{3\pi}{2}\right).$$

Moreover, four differential modes for four quads including (q($\varphi$, 0), $$q\left(\varphi, \frac{\pi}{2}\right), q(\varphi, \pi), \text{ and } q\left(\varphi, \frac{3\pi}{2}\right)$$

for the corresponding phase delays $$\left(\text{i.e. } 0, \frac{\pi}{2}, \pi, \text{ and } \frac{3\pi}{2}\right)$$

may be obtained, respectively.

The obtained differential modes may represent the depth information, for example, the $\varphi$ (i.e. the phase angle between illumination and reflection) and the distance d may be represented based on the following equations:

$$\varphi \approx \arctan\left(\frac{\left(q\left(\varphi, \frac{\pi}{2}\right) - q\left(\varphi, \frac{3\pi}{2}\right)\right)}{(q(\varphi, 0) - q(\varphi, \pi))}\right) \quad (1)$$

$$d = \frac{c}{4\pi f}\varphi \quad (2)$$

wherein, c is the speed of light and f is the frequency of the light.

As discussed, each pixel may generate two outputs and the differential mode for the quads obtained from these two outputs may provide information about the depth.

Moreover, the circuitry obtains the first input based on a common mode signal for the quad of the pixel, being representative of an intensity of ambient light.

For example, each pixel generates two outputs, as discussed above, and the common mode signal for the quad of the pixel may be obtained and it may be representative of, for example, the intensity level of the ambient light.

For example, in some embodiments, the ToF sensor may obtain four samples per every measurement in which each sample may be corresponding to a quad and may be phase delayed by 90 degrees, as discussed above. Moreover, four common mode signals including $C_1$, $C_2$, $C_3$, and $C_4$ may be obtained for four quads of the pixel corresponding to four phase delays $$\left(\text{i.e. } 0, \frac{\pi}{2}, \pi, \text{ and } \frac{3\pi}{2}\right),$$

respectively.

Moreover, the first input may be obtained based on the four common mode signals ($C_1$, $C_2$, $C_3$, and $C_4$) and it may be representative of the intensity of the ambient light, or the like.

For example, in some embodiments, a program running on the circuitry may obtain the first input being proportional to a mathematical function of the four common mode signals, e.g., based on the following function:

$$\text{first input} \propto F(C_1, C_2, C_3, C_4) \propto F\left(\frac{C_2 - C_4}{C_1 - C_3}\right) \quad (3)$$

Moreover, the circuitry obtains a second input (k) being representative of a background light rejection ratio of the pixel.

For example, in some embodiments, the second input k may be a coefficient, which is, for example, specific to each pixel, may depend on physical, electrical, and optical characteristics of the pixel, and may be constant during time, etc.

Furthermore, the circuitry estimates the phase for the pixel from the plurality of pixels of the image sensor based on the differential mode, the first input and the second input.

For example, in some embodiments, a program running on the circuitry may estimate the phase based on the following equation:

$$tg(\varphi) = \frac{\left(q\left(\varphi, \frac{\pi}{2}\right) - q\left(\varphi, \frac{3\pi}{2}\right)\right) - k(C_2 - C_4)}{(q(\varphi, 0) - q(\varphi, \pi)) - k(C_1 - C_3)} \quad (4)$$

The present disclosure is not limited on the number of samples and the phase delayed, for example, there might be n samples corresponding to an n-quad pixel, moreover, the phase may be delayed by (360/n), etc.

In some embodiments, the circuitry may further include one or more processors, one or microprocessors, dedicated circuits, logic circuits, a memory (RAM, ROM, or the like), a storage, an interface (e.g., a wireless interface such as Bluetooth, infrared, etc.), etc., as it is generally known.

In some embodiments, the time of flight sensor may include, for example, the circuitry and/or a processor and/or an image processing unit, hence, a program may be installed on its circuitry and/or its processor, moreover, for example, the differential modes for the quads, the common modes for the quads, the first input, and the second input may be obtained, and the phase may be estimated, etc.

Moreover, in some embodiments, the interface may be adapted to communicate with a mobile telecommunication system, e.g., LTE, GSM, or the like. Moreover, the interface may further be adapted to perform wireless communication with a wireless local area network, for example, to communicate over Bluetooth. Thereby, in some embodiments, the time of flight sensor may establish a connection to the internet.

In some embodiments, obtaining the second input may include obtaining the differential mode for the quad of the pixel based on different intensities of a background illumination. For example, a program running on the circuitry may obtain the pixel differential output (q) for different background illumination values, and it may be used to measure the background light rejection ration (k), or the like.

In some embodiments, obtaining the second input may include obtaining the common mode signal for the quad of the pixel based on the different intensities of the background illumination.

For example, a program running on the circuitry may obtain the pixel common output (C) for different background illumination values, and it may be used to measure the background light rejection ration (k), or the like.

Moreover, the saturated pixels which have, for example, a value above the threshold where the pixel saturates and its behavior becomes non-linear may be discarded, or the like.

In some embodiments, obtaining the second input may include estimating an angular coefficient of a linear regression model for a linear function of the differential mode and the common mode signal.

For example, a program running on the circuitry may plot the differential values versus the common values and it may further compute the background light rejection ration (k) as the angular coefficient of linear regression, or the like.

Hence, in some embodiments, the background light rejection ration (k) may be estimated.

In some embodiments, it may be possible to estimate the k value, for example, during the camera's calibration (e.g. with a controlled background illumination), on the fly (e.g., using "black frames" during which no light is emitted), or the like.

In some embodiments, obtaining the second input may include estimating an average value for two differential modes being correspondent to two quads of the pixel with opposing phase delays.

For example, an average value for two differential modes for opposing phases (i.e. 0° and 180°) may be obtained, e.g, by using a program running on the circuitry, and the obtained average value may allow to perform the measurement with the active light illumination on, or the like.

In some embodiments, obtaining the second input may include a measurement based on an active light illumination.

In some embodiments, the phase may be estimated based on $$tg(\varphi) = \frac{\left(q\left(\varphi, \frac{\pi}{2}\right) - q\left(\varphi, \frac{3\pi}{2}\right)\right) - k(C_2 - C_4)}{(q(\varphi, 0) - q(\varphi, \pi)) - k(C_1 - C_3)},$$

wherein the $q(\varphi, 0)$ corresponds to the differential mode for the quad of the pixel with an illumination with 0° phase delay, wherein the $$q\left(\varphi, \frac{\pi}{2}\right)$$

corresponds to the differential mode for the quad of the pixel with an illumination with 90° phase delay, wherein the $q(\varphi, \pi)$ corresponds to the differential mode for the quad of the pixel with an illumination with 180° phase delay, wherein $$q\left(\varphi, \frac{3\pi}{2}\right)$$

corresponds to the differential mode for the quad of the pixel with an illumination with 270° phase delay, wherein $C_1$ corresponds to the common mode signal for the quad of the pixel with an illumination with 0° phase delay, wherein $C_2$ corresponds to the common mode signal for the quad of the pixel with an illumination with 90° phase delay, wherein $C_3$ corresponds to the common mode signal for the quad of the pixel with an illumination with 180 phase delay, wherein $C_4$ corresponds to the common mode signal for the quad of the pixel with an illumination with 270° phase delay, wherein k corresponds to the second input, and wherein $\varphi$ corresponds to the phase for the pixel.

In some embodiments, the inphase component, i.e., the real part (I) and the imaginary part (Q) for the pixel of the image sensor may be obtained, as it is generally known to the skilled person.

As discussed, in some embodiments, the pixel may have two outputs (i.e. COL0 and COL1), moreover, the differential mode may be obtained based on a subtraction of the two outputs as (COL1−COL0), as it is generally known to the skilled person.

Moreover, the common mode signal may be obtained based on a summation of the two outputs as ((COL1+COL0)/2), as it is generally known to the skilled person.

Hence, in some embodiments, the impact of the background light variation on the I and Q computation may be, for example, corrected without modification to the sensor, camera or operating mode.

In some embodiments, the background light variation may induce phase error, furthermore, the background light rejection ratio may be the root cause of the error. Moreover, the common mode and the differential mode may be obtained and may provide information to, for example, correct the error, estimate the phase, etc.

In some embodiments, the second input (k) may be obtained which may be representative of the background light rejection ratio of the pixel, moreover, the device (e.g. the time of flight sensor) may, for example, have a high k value, and it may have robust to rapidly varying background light, or the like.

In some embodiments, the device (e.g. the time of flight sensor) may be exposed to rapidly moving background light, and the phase may be estimated.

In some embodiments, the device (e.g. the time of flight sensor) may not include, for example, an N-phase type sensor in which the different sampling are interleaved. However, it may be possible that, for example, the time of flight sensor may be in a different form to compensate the new background light rejection imperfections of the N-phase pixel, or the like.

In some embodiments, the impact of the incomplete rejection of the background light in the differential modes of the pixel may be reduced.

Moreover, the difference between the two opposing quads may be computed, for example, when the background light has changed significantly between the two quads e.g. by keeping the opposed quads as close as possible in time, and by maximizing the rejection of the background light in the pixel differential output, or the like.

In some embodiments, the noise in the depth/confidence computation may be reduced.

In some embodiments, the processing time to compute, for example, the correction, collect the common mode signals values may be enhanced, or the like.

In some embodiments, an overhead may be incurred, for example, to measure and/or to maintain the k factors, e.g. through calibration during manufacturing, a camera start-up, on the flight, etc.

Some embodiments pertain to a method for a device comprising circuitry including an image sensor having a plurality of pixels, the method includes obtaining a differential mode for a quad of each pixel from the plurality of pixels of the image sensor, being representative of a depth information; obtaining a first input based on a common mode signal for the quad of the pixel, being representative of an intensity of ambient light obtaining a second input being representative of a background light rejection ratio of the pixel; and estimating a phase for the pixel from the plurality of pixels of the image sensor based on the differential mode, the first input and the second input. As discussed, the image sensor may include the plurality of the pixels, the method may further include the pixel being a 4-quad pixel, and wherein obtaining the differential mode includes obtaining four differential modes based on four different illumination phase delays. Moreover, the method may further include obtaining the differential mode for the quad of the pixel based on different intensities of a background illumination. Moreover, the method may further include obtaining the common mode signal for the quad of the pixel based on the different intensities of the background illumination. As discussed the second input may be obtained, the method may further include estimating an angular coefficient of a linear regression model for a linear function of the differential mode and the common mode signal. Moreover, the method may further include estimating an average value for two differential modes being correspondent to two quads of the pixel with opposing phase delays. Moreover, the method may further include a measurement based on an active light illumination. As discussed, the method may further be for a device being a time of flight sensor. As discussed, the phase may be estimated, Moreover, the method may further include estimating the phase based on $$tg(\varphi) = \frac{\left(q\left(\varphi, \frac{\pi}{2}\right) - q\left(\varphi, \frac{3\pi}{2}\right)\right) - k(C_2 - C_4)}{(q(\varphi, 0) - q(\varphi, \pi)) - k(C_1 - C_3)},$$

wherein the $q(\varphi, 0)$ corresponds to the differential mode for the quad of the pixel with an illumination with 0° phase delay, wherein the $$q\left(\varphi, \frac{\pi}{2}\right)$$

corresponds to the differential mode for the quad of the pixel with an illumination with 90° phase delay, wherein the $q(\varphi, \pi)$ corresponds to the differential mode for the quad of the pixel with an illumination with 180 phase delay, wherein $$q\left(\varphi, \frac{3\pi}{2}\right)$$

corresponds to the differential mode for the quad of the pixel with an illumination with 270° phase delay, wherein $C_1$ corresponds to the common mode signal for the quad of the pixel with an illumination with 0° phase delay, wherein $C_2$ corresponds to the common mode signal for the quad of the pixel with an illumination with 90° phase delay, wherein $C_3$ corresponds to the common mode signal for the quad of the pixel with an illumination with 180 phase delay, wherein $C_4$ corresponds to the common mode signal for the quad of the pixel with an illumination with 270° phase delay, wherein k corresponds to the second input, and wherein $\varphi$ corresponds to the phase for the pixel.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Returning to FIG. 1, an embodiment of a system 1 including the device 10 for obtaining a differential mode and a common mode signal for each quad of a pixel is illustrated.

The system 1 may be the device including the circuitry and/or the device including the circuitry may be incorporated in the system 1.

The device 10 is a time of flight sensor including an image sensor with a plurality of pixels (not shown).

The time of flight sensor has a pixel 11 included in the plurality of pixels. The pixel 11 has two transfer gates TX0 and TX1.

Moreover, the pixel 11 has two floating diffusion nodes FD0 and FD1, which are based on storage sites and are electrically isolated from all other nodes in the time of flight sensor.

The floating diffusion nodes are based on quasi-neutral regions with a potential determined exclusively by the amount of charge stored in them, and their capacitance.

The storage sites (i.e. floating diffusion nodes FD0 and FD1) and transfer gates TX0 and TX1 are formed within or above an epitaxial p-layer (non-shown).

During an exposure time T, the transfer gates TX0 and TX1 are driven with demodulation signals, as discussed above. Furthermore, electrons are transferred to the floating diffusion nodes FD0 or FD1 based on the demodulation signal.

Moreover, before the readout, the floating diffusion nodes FD0, FD1 are reset by rest transistors RST. During the readout, the electrons accumulated in the photodiodes of the pixel are transferred to the floating diffusion nodes FD0, FD1 by opening transfer gates TX0, TX1, respectively.

The voltage at the floating diffusion nodes FD0, FD1 changes and these changes are amplified by the source follower transistors SF and readout using the selection transistor SEL.

The pixel is a four-quad pixel which each quad is phase delayed by 90 degree. Moreover, the pixel has two lines for measurements including COL1 and COL0.

The device 10 obtains a differential mode for each quad. In the embodiment of FIG. 1, the differential mode (q) is a differential signal obtained by (COL1−COL0), as q=COL1−COL0, as discussed above.

Moreover, the device 10 obtains a common mode signal for each quad of the pixel. The common mode signal (C) is obtained based on ((COL1+COL0)/2), as C=((COL1+COL0)/2), as discussed above.

In some embodiments, the k may be estimated with the same assumption, and in the formula for estimation of C the division of 2 may be optional.

Hence, the device 10 is able to obtain a differential mode signal and a common mode signal for each quad of the pixel.

Figure 2:
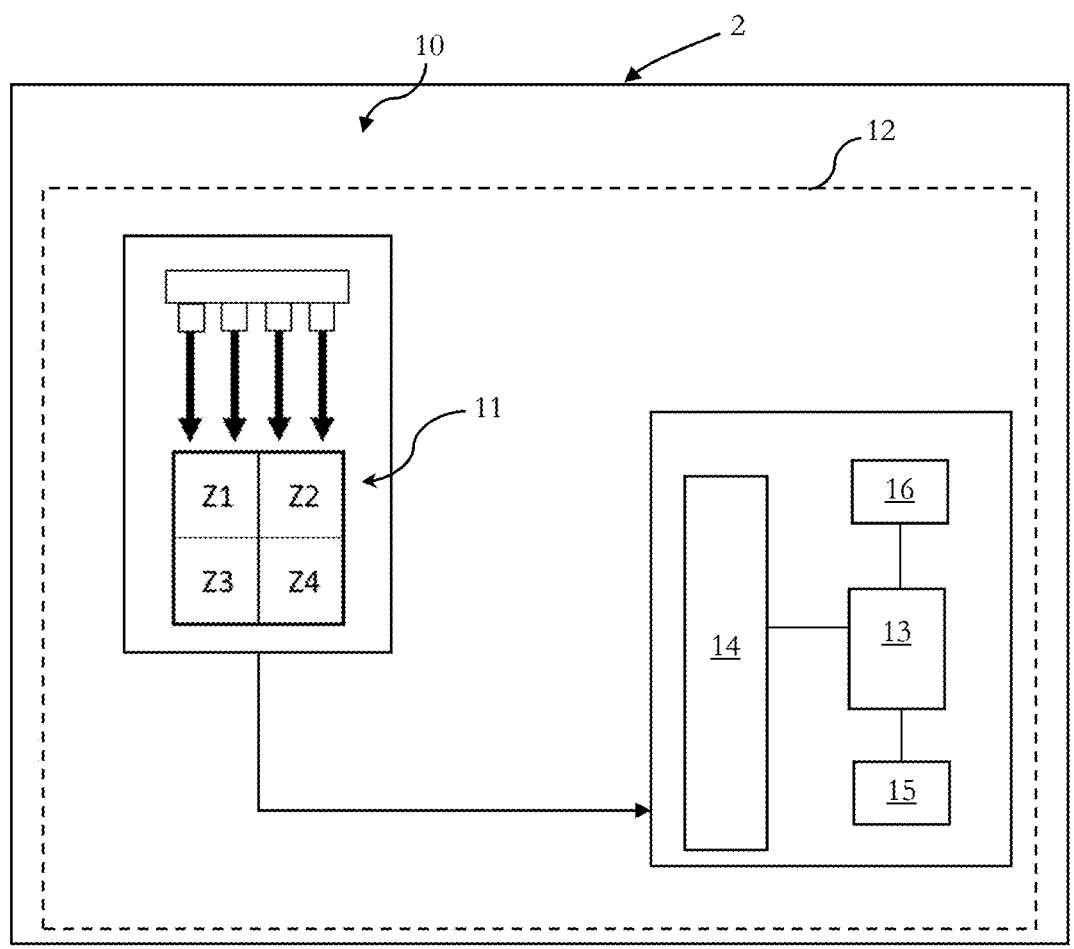
FIG. 2 schematically illustrates an embodiment of a system including the device having the circuitry for obtaining a differential mode, obtaining a first input, obtaining a second input and estimating a phase.

FIG. 2 schematically illustrates an embodiment of a system 2 including the device 10 having a circuitry 12 for obtaining the differential mode, obtaining the first input, obtaining the second input and estimating the phase.

The system 2 may be the device 10 including the circuitry 12 and/or the device 10 including the circuitry 12 may be incorporated in the system 2.

For example, the system 2 has the device 10 including the circuitry 12 running a program, which is used for obtaining the differential mode, obtaining the first input, obtaining the second input and estimating the phase, as discussed above.

The pixel 11 is based on a CCD, as discussed above.

The pixel 11 is a four-quad pixel and includes four sub-pixels of Z1, Z2, Z3, and Z4, respectively.

Moreover, the pixel 11 generates a differential mode and a common mode signals, as discussed above.

The circuitry 12 has a processor 13 (including one or more processor), a random access memory 15, an interface 14, and a storage 16, wherein the storage 16 is a flash memory in these embodiments, without limiting the disclosure in that regard.

The interface 14 is configured to perform communication over wire and wirelessly (Bluetooth and wireless local area network). The interface may further be able to communicate with other electronic devices over internet, a network, a stored database in the cloud, etc.

The processor 13 is able to run the program for obtaining the differential mode, obtaining the first input, obtaining the second input and estimating the phase, as discussed above, and it may be configured to perform the method as also discussed above and further below.

Figure 3:
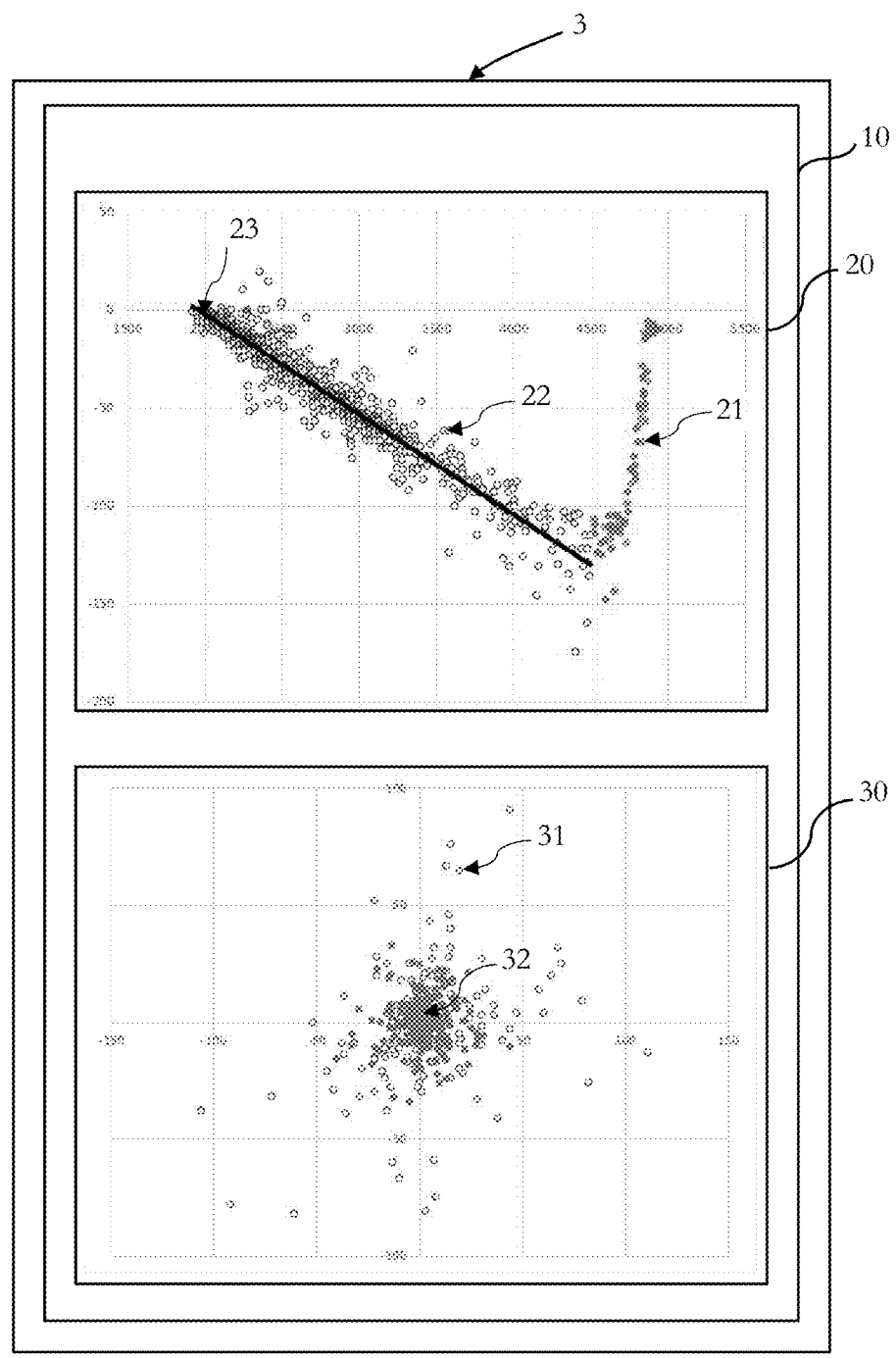
FIG. 3 schematically illustrates an embodiment of a system including the device having the circuitry for estimating a background light rejection ratio.

FIG. 3 schematically illustrates an embodiment of a system 3 including the device 10 having the circuitry 12 (not shown) for estimating the background light rejection ratio.

The system 3 may be the device including the circuitry and/or the device including the circuitry may be incorporated in the system 3.

As discussed, the circuitry 12 of the device 10 obtains the differential modes and the common mode signals. The differential modes (q) and the common mode signals (C) are measured for different intensities of the background light illumination, as discussed above.

Moreover, a program 20 (e.g., an image processing program) running on the circuitry 12 of the device 10 plots the differential modes values 22 as a function of the common mode signals values 21 for the pixel 11, as discussed above.

The program 20 discards the saturated pixels which have a value above the threshold, as discussed above.

The program 20 further estimates the k as the angular coefficient of linear regression 23 for the remaining measurements (i.e. the slope 23), as discussed above.

Hence, the device 10 is able to estimate the background light rejection ratio.

Moreover, a program 30 running the circuitry 12 of the device 10 obtains the in-phase component (i.e. the real part I and the imaginary part Q) for the time of flight sensor, before and after the The program 30 further plots the I/Q distribution before and after the correction for the background light rejection ratio.

The program 30 obtains the I/Q distribution 31, before the background light rejection ratio, as discussed above.

Moreover, the program 30 obtains the I/Q distribution 32, after the background light rejection ratio, as discussed above.

For example, in some embodiments, the I/Q distribution 32 after the background light rejection ratio may be corrected for the intensities of the background light illuminations, e.g., with respect to the I/Q distribution 31, as discussed above.

The distribution of I/Q values measured on the pixel over 200 frames captured with the device moving outside (i.e. the device being the time of flight camera), and without active light illumination.

Moreover, without noise the errors points should be at (0,0). The points before corrections are shown in 31, and after correction are shown in 32.

It can be taken from FIG. 3, that the variance has been reduced by 4 and the maximum error by 3, (i.e. bringing it in the range of the signal to noise ratio (SNR) of 3.5).

In the following, a method 40 for estimating the phase for the pixel is explained under the reference of FIG. 4. The method may be performed by and with any of the device and/or systems and/or circuitries described herein, such as the device 10, the circuitry 12, the system 1 of FIG. 1, the system 2 of FIG. 2, the system 3 of FIG. 3, etc. Without limiting the disclosure, in the following, the method 40 is discussed exemplary based on the device 10 including the circuitry 12.

Figure 4:
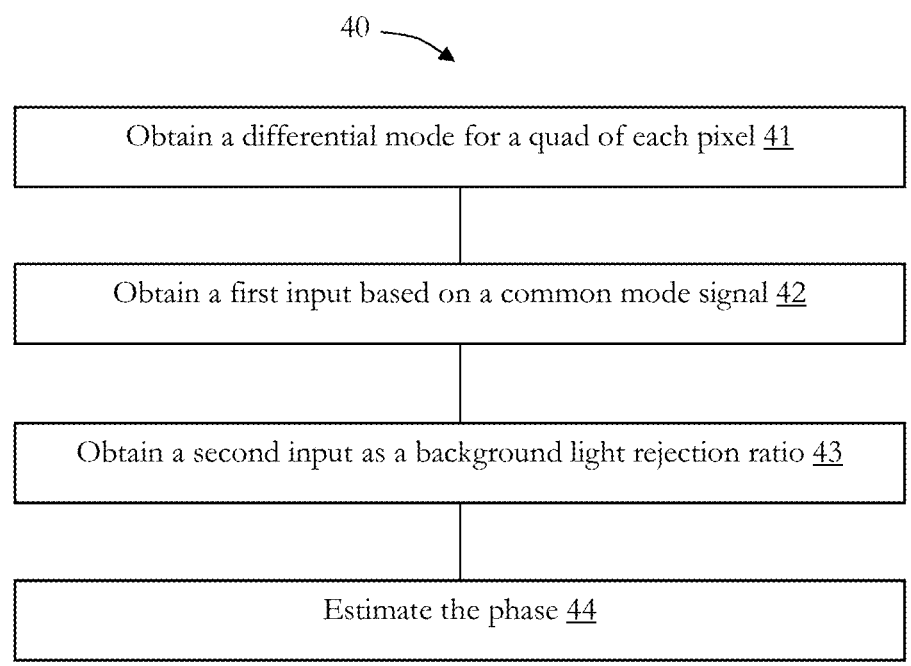
FIG. 4 schematically illustrates an embodiment of a method for estimating a phase for a pixel.

FIG. 4 illustrates an embodiment of a method for estimating a phase for a pixel.

At 41, the circuitry obtains a differential mode for each quad of each pixel 11 from the plurality of pixels of the image sensor, as discussed above.

A program running on the circuitry obtains the differential mode for the quad based on the q=COL1−COL0, as discussed above.

The circuitry further obtains four differential modes for the four quads of the pixel 11, as discussed above. The obtained differential modes are representative of the depth information.

At 42, the circuitry obtains a first input based on a common mode signal. The first input is a representative of an intensity of ambient light, as discussed above.

A program running on the circuitry 12 obtains the common mode signal for the quad based on the C=((COL1+COL0)/2), as discussed above.

The circuitry 12 further obtains four common mode signals for four quads of the pixel 11, as discussed above. The obtained common mode signals are representative of the intensity of the ambient light, as discussed above.

At 43, the circuitry obtains the second input being representative of a background light rejection ratio.

A program running on the circuitry 12 estimates the angular coefficient of the linear regression model for the linear function of the obtained differential model (i.e. obtained at 41) versus the obtained common mode signals (i.e. obtained at 42), as discussed above, and estimates the background light rejection ratio.

At 44, the circuitry estimates the phase.

A program running on the circuitry 12 estimates the phase based on the equation (4), as discussed above.

The program uses the obtained differential mode, the first input and the second input and estimates the phase, as discussed above.

It should be recognized that the embodiments describe methods with an exemplary ordering of method steps. The specific ordering of method steps is however given for illustrative purposes only and should not be construed as binding. For example the ordering of 11 and 13 in the embodiment of FIG. 2 may be exchanged. Also, the ordering of 21, 22 and 23 in the embodiment of FIG. 3 may be exchanged. Further, also the ordering of 31 and 32 in the embodiment of FIG. 3 may be exchanged. Other changes of the ordering of method steps may be apparent to the skilled person.

Please note that the division of the circuitry 12 into units 11 to 16 is only made for illustration purposes and that the present disclosure is not limited to any specific division of functions in specific units. For instance, the circuitry 12 could be implemented by a respective programmed processor, field programmable gate array (FPGA) and the like.

A method for controlling an electronic device, such as the device 10 discussed above, is described in the following and under reference of FIG. 4. The method can also be implemented as a computer program causing a computer and/or a processor, such as processor 13 discussed above, to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A device comprising circuitry including an image sensor having a plurality of pixels, the circuitry is configured to:
  obtain a differential mode for a quad of each pixel from the plurality of pixels of the image sensor, being representative of a depth information;
  obtain a first input based on a common mode signal for the quad of the pixel, being representative of an intensity of ambient light
  obtain a second input being representative of a background light rejection ratio of the pixel; and
  estimate a phase for the pixel from the plurality of pixels of the image sensor based on the differential mode, the first input and the second input.

(2) The device of (1), wherein the pixel is a 4-quad pixel, and wherein obtaining the differential mode includes obtaining four differential modes based on four different illumination phase delays.

(3) The device of (1) or (2), wherein obtaining the second input includes obtaining the differential mode for the quad of the pixel based on different intensities of a background illumination.

(4) The device of anyone of (1) to (3), wherein obtaining the second input includes obtaining the common mode signal for the quad of the pixel based on the different intensities of the background illumination.

(5) The device of anyone of (1) to (4), wherein obtaining the second input includes estimating an angular coefficient of a linear regression model for a linear function of the differential mode and the common mode signal.

(6) The device of anyone of (1) to (5), wherein obtaining the second input includes estimating an average value for two differential modes being correspondent to two quads of the pixel with opposing phase delays.

(7) The device of anyone of (1) to (6), wherein obtaining the second input includes a measurement based on an active light illumination.

(8) The device of anyone of (1) to (7), is a time of flight sensor.

(9) The device of anyone of (1) to (8), wherein the phase is estimated based on $$tg(\varphi) = \frac{\left(q\left(\varphi, \frac{\pi}{2}\right) - q\left(\varphi, \frac{3\pi}{2}\right)\right) - k(C_2 - C_4)}{(q(\varphi, 0) - q(\varphi, \pi)) - k(C_1 - C_3)},$$

wherein the $q(\varphi, 0)$ corresponds to the differential mode for the quad of the pixel with an illumination with 0° phase delay, wherein the $$q\left(\varphi, \frac{\pi}{2}\right)$$

corresponds to the differential mode for the quad of the pixel with an illumination with 90° phase delay, wherein the $q(\varphi,$ π) corresponds to the differential mode for the quad of the pixel with an illumination with 180° phase delay, wherein $$q\left(\varphi, \frac{3\pi}{2}\right)$$

corresponds to the differential mode for the quad of the pixel with an illumination with 270° phase delay, wherein $C_1$ corresponds to the common mode signal for the quad of the pixel with an illumination with 0° phase delay, wherein $C_2$ corresponds to the common mode signal for the quad of the pixel with an illumination with 90° phase delay, wherein $C_3$ corresponds to the common mode signal for the quad of the pixel with an illumination with 180° phase delay, wherein $C_4$ corresponds to the common mode signal for the quad of the pixel with an illumination with 270° phase delay, wherein k corresponds to the second input, and wherein φ corresponds to the phase for the pixel.

(10) A method for a device comprising circuitry including an image sensor having a plurality of pixels, the method comprises:
  obtaining a differential mode for a quad of each pixel from the plurality of pixels of the image sensor, being representative of a depth information;
  obtaining a first input based on a common mode signal for the quad of the pixel, being representative of an intensity of ambient light;
  obtaining a second input being representative of a background light rejection ratio of the pixel; and
  estimating a phase for the pixel from the plurality of pixels of the image sensor based on the differential mode, the first input and the second input.

(11) The method of (10), wherein the pixel is a 4-quad pixel, and wherein obtaining the differential mode includes obtaining four differential modes based on four different illumination phase delays.

(12) The method of (10) or (11), wherein obtaining the second input includes obtaining the differential mode for the quad of the pixel based on different intensities of a background illumination.

(13) The method of anyone of (10) to (12), wherein obtaining the second input includes obtaining the common mode signal for the quad of the pixel based on the different intensities of the background illumination.

(14) The method of anyone of (10) to (13), wherein obtaining the second input includes estimating an angular coefficient of a linear regression model for a linear function of the differential mode and the common mode signal.

(15) The method of anyone of (10) to (14), wherein obtaining the second input includes estimating an average value for two differential modes being correspondent to two quads of the pixel with opposing phase delays.

(16) The method of anyone of (10) to (15), wherein obtaining the second input includes a measurement based on an active light illumination.

(17) The method of anyone of (10) to (16), wherein the device is a time of flight sensor.

(18) The method of anyone of (10) to (17), further comprising estimating the phase based on $$tg(\varphi) = \frac{\left(q\left(\varphi, \frac{\pi}{2}\right) - q\left(\varphi, \frac{3\pi}{2}\right)\right) - k(C_2 - C_4)}{(q(\varphi, 0) - q(\varphi, \pi)) - k(C_1 - C_3)},$$

wherein the q(φ, 0) corresponds to the differential mode for the quad of the pixel with an illumination with 0° phase delay, wherein the $$q\left(\varphi, \frac{\pi}{2}\right)$$

corresponds to the differential mode for the quad of the pixel with an illumination with 90° phase delay, wherein the q(φ, π) corresponds to the differential mode for the quad of the pixel with an illumination with 180° phase delay, wherein $$q\left(\varphi, \frac{3\pi}{2}\right)$$

corresponds to the differential mode for the quad of the pixel with an illumination with 270° phase delay, wherein $C_1$ corresponds to the common mode signal for the quad of the pixel with an illumination with 0° phase delay, wherein $C_2$ corresponds to the common mode signal for the quad of the pixel with an illumination with 90° phase delay, wherein $C_3$ corresponds to the common mode signal for the quad of the pixel with an illumination with 180° phase delay, wherein $C_4$ corresponds to the common mode signal for the quad of the pixel with an illumination with 270° phase delay, wherein k corresponds to the second input, and wherein φ corresponds to the phase for the pixel.

(19) A computer program comprising program code causing a computer to perform the method according to anyone of (10) to (18), when being carried out on a computer.

(20) A non-transitory computer-readable recording medium that stores therein a computer program product, which, when executed by a processor, causes the method according to anyone of (10) to (18) to be performed.

The invention claimed is:

1. A device comprising circuitry including an image sensor having a plurality of pixels, the circuitry is configured to:
  obtain a differential mode for a quad of each pixel from the plurality of pixels of the image sensor, being representative of a depth information;
  obtain a first input based on a common mode signal for the quad of the pixel, being representative of an intensity of ambient light;
  obtain a second input being representative of a background light rejection ratio of the pixel; and
  estimate a phase for the pixel from the plurality of pixels of the image sensor based on the differential mode, the first input and the second input.

2. The device of claim 1, wherein the pixel is a four-quad pixel, and wherein obtaining the differential mode includes obtaining four differential modes based on four different illumination phase delays.

3. The device of claim 1, wherein obtaining the second input includes obtaining the differential mode for the quad of the pixel based on different intensities of a background illumination.

4. The device of claim 3, wherein obtaining the second input includes obtaining the common mode signal for the quad of the pixel based on the different intensities of the background illumination.

5. The device of claim 4, wherein obtaining the second input includes estimating an angular coefficient of a linear regression model for a linear function of the differential mode and the common mode signal.

6. The device of claim 2, wherein obtaining the second input includes estimating an average value for two differential modes being correspondent to two quads of the pixel with opposing phase delays.

7. The device of claim 6, wherein obtaining the second input includes a measurement based on an active light illumination.

8. The device of claim 1, wherein the device is a time of flight sensor.

9. The device of claim 2, wherein the phase is estimated based on $$tg(\varphi) = \frac{\left(q\left(\varphi, \frac{\pi}{2}\right) - q\left(\varphi, \frac{3\pi}{2}\right)\right) - k(C_2 - C_4)}{(q(\varphi, 0) - q(\varphi, \pi)) - k(C_1 - C_3)},$$

wherein the $q(\varphi, 0)$ corresponds to the differential mode for the quad of the pixel with an illumination with 0° phase delay, wherein the $$q\left(\varphi, \frac{\pi}{2}\right)$$

corresponds to the differential mode for the quad of the pixel with an illumination with 90° phase delay, wherein the $q(\varphi, \pi)$ corresponds to the differential mode for the quad of the pixel with an illumination with 180° phase delay, wherein $$q\left(\varphi, \frac{3\pi}{2}\right)$$

corresponds to the differential mode for the quad of the pixel with an illumination with 270° phase delay, wherein $C_1$ corresponds to the common mode signal for the quad of the pixel with an illumination with 0° phase delay, wherein $C_2$ corresponds to the common mode signal for the quad of the pixel with an illumination with 90° phase delay, wherein $C_3$ corresponds to the common mode signal for the quad of the pixel with an illumination with 180° phase delay, wherein $C_4$ corresponds to the common mode signal for the quad of the pixel with an illumination with 270° phase delay, wherein k corresponds to the second input, and wherein φ corresponds to the phase for the pixel.

10. A method for a device comprising circuitry including an image sensor having a plurality of pixels, the method comprising:
  obtaining a differential mode for a quad of each pixel from the plurality of pixels of the image sensor, being representative of a depth information;
  obtaining a first input based on a common mode signal for the quad of the pixel, being representative of an intensity of ambient light;
  obtaining a second input being representative of a background light rejection ratio of the pixel; and
  estimating a phase for the pixel from the plurality of pixels of the image sensor based on the differential mode, the first input and the second input.

11. The method of claim 10, wherein the pixel is a four-quad pixel, and wherein obtaining the differential mode includes obtaining four differential modes based on four different illumination phase delays.

12. The method of claim 10, wherein obtaining the second input includes obtaining the differential mode for the quad of the pixel based on different intensities of a background illumination.

13. The method of claim 12, wherein obtaining the second input includes obtaining the common mode signal for the quad of the pixel based on the different intensities of the background illumination.

14. The method of claim 13, wherein obtaining the second input includes estimating an angular coefficient of a linear regression model for a linear function of the differential mode and the common mode signal.

15. The method of claim 11, wherein obtaining the second input includes estimating an average value for two differential modes being correspondent to two quads of the pixel with opposing phase delays.

16. The method of claim 15, wherein obtaining the second input includes a measurement based on an active light illumination.

17. The method of claim 10, wherein the device is a time of flight sensor.

18. The method of claim 11, further comprising estimating the phase based on $$tg(\varphi) = \frac{\left(q\left(\varphi, \frac{\pi}{2}\right) - q\left(\varphi, \frac{3\pi}{2}\right)\right) - k(C_2 - C_4)}{(q(\varphi, 0) - q(\varphi, \pi)) - k(C_1 - C_3)},$$

wherein the $q(\varphi, 0)$ corresponds to the differential mode for the quad of the pixel with an illumination with 0° phase delay, wherein the $$q\left(\varphi, \frac{\pi}{2}\right)$$

corresponds to the differential mode for the quad of the pixel with an illumination with 90° phase delay, wherein the $q(\varphi, \pi)$ corresponds to the differential mode for the quad of the pixel with an illumination with 180 phase delay, wherein $$q\left(\varphi, \frac{3\pi}{2}\right)$$

corresponds to the differential mode for the quad of the pixel with an illumination with 270° phase delay, wherein $C_1$ corresponds to the common mode signal for the quad of the pixel with an illumination with 0° phase delay, wherein $C_2$ corresponds to the common mode signal for the quad of the pixel with an illumination with 90° phase delay, wherein $C_3$ corresponds to the common mode signal for the quad of the pixel with an illumination with 180° phase delay, wherein $C_4$ corresponds to the common mode signal for the quad of the pixel with an illumination with 270° phase delay, wherein k corresponds to the second input, and wherein φ corresponds to the phase for the pixel.

* * * * *